United States Patent [19]
Gunlock et al.

[11] Patent Number: 5,378,004
[45] Date of Patent: Jan. 3, 1995

[54] DEVICE FOR REMOVING BRAKE DRUM AND HUB ASSEMBLY

[75] Inventors: Danny E. Gunlock, Helena; C. Craig Rawlings; Ed J. McGee, both of Missoula, all of Mont.

[73] Assignee: The Prodx Company, Missoula, Mont.

[21] Appl. No.: 12,294

[22] Filed: Feb. 1, 1993

[51] Int. Cl.$^6$ .............................................. B62B 3/02
[52] U.S. Cl. ........................ 280/47.2; 280/47.28; 280/47.29; 280/47.34; 280/79.4; 414/427; 254/8 B
[58] Field of Search ............... 280/47.15, 47.2, 47.17, 280/47.18, 47.19, 47.24, 47.28, 47.29, 47.34, 79.4; 254/8 B; 414/589, 426, 427, 490; 29/273

[56] References Cited

U.S. PATENT DOCUMENTS

| | | | |
|---|---|---|---|
| 1,865,420 | 6/1932 | Kick | 29/425.5 |
| 2,493,289 | 1/1950 | Hawkinson | 157/14 |
| 2,795,433 | 6/1957 | Moriarty | 280/47.28 |
| 2,903,147 | 9/1959 | Davis, Jr. | 414/490 |
| 2,917,193 | 12/1959 | Fike | 280/47.24 |
| 3,225,868 | 12/1965 | Barnes | 414/444 |
| 3,907,138 | 9/1975 | Rhodes | 280/47.29 |
| 3,951,286 | 4/1976 | Horst | 280/47.29 |
| 4,244,595 | 1/1981 | Sagert | 414/490 |
| 4,570,953 | 2/1986 | McPesk et al. | 280/47.29 |
| 4,642,866 | 2/1987 | Murtaugh | 29/259 |
| 4,930,466 | 6/1990 | Chien | 29/273 |
| 5,123,666 | 6/1992 | Moore | 280/47.28 |

Primary Examiner—Richard M. Camby
Attorney, Agent, or Firm—Klarquist, Sparkman, Campbell, Leigh & Whinston

[57] ABSTRACT

The device attaches to and carries the brake drum and/or hub assembly of a vehicle, especially large vehicles such as commercial trucks and including semi-tractors and trailers. The device includes a hand truck, a jack that is attached to the hand truck, and an assembly attachment unit, operably connected to the jack, for securely attaching the device to the assembly. The jack provides height adjustment capability for the assembly attachment unit along an axis of the hand truck. Angle adjustment means also are provided for adjusting the angle of the assembly attachment unit to accommodate the angle presented by an exterior surface portion of the brake drum and/or hub assembly.

27 Claims, 6 Drawing Sheets

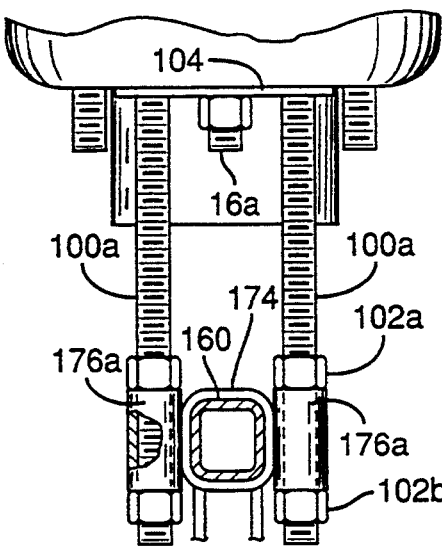
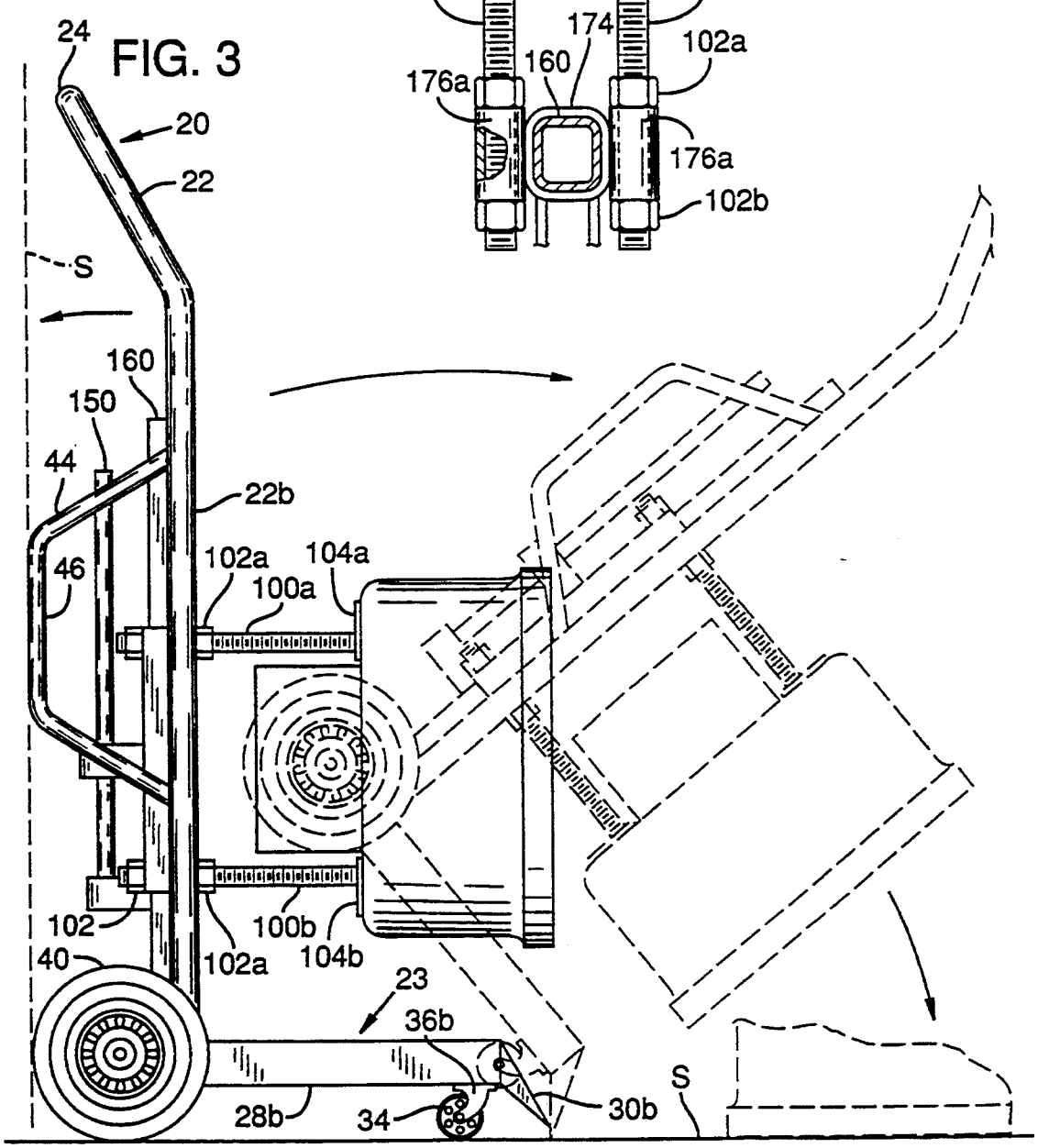

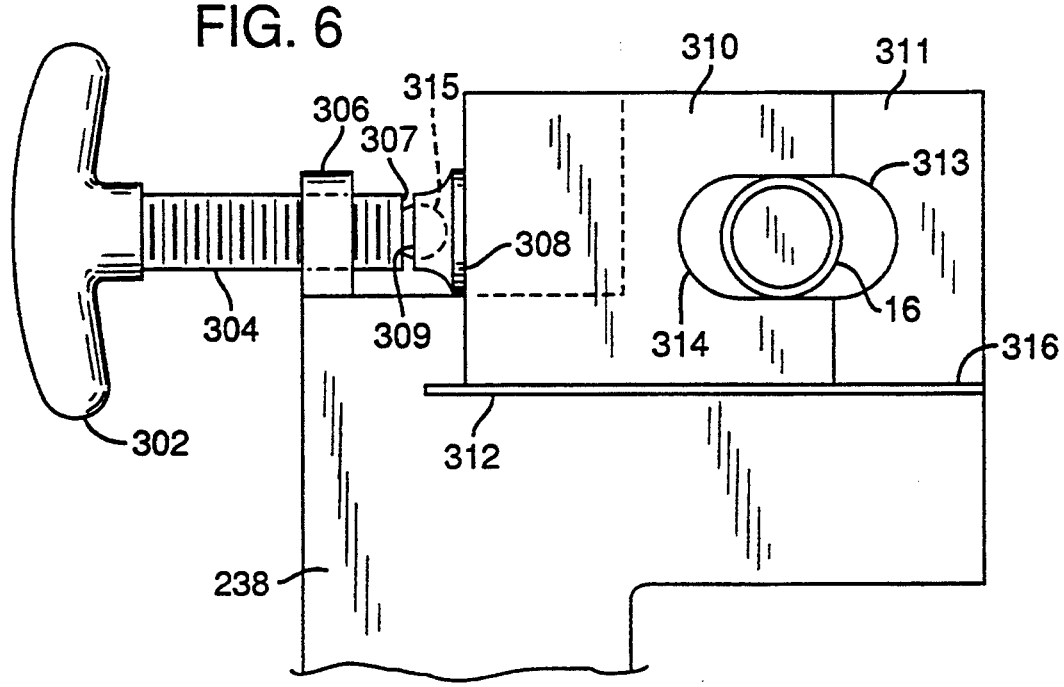
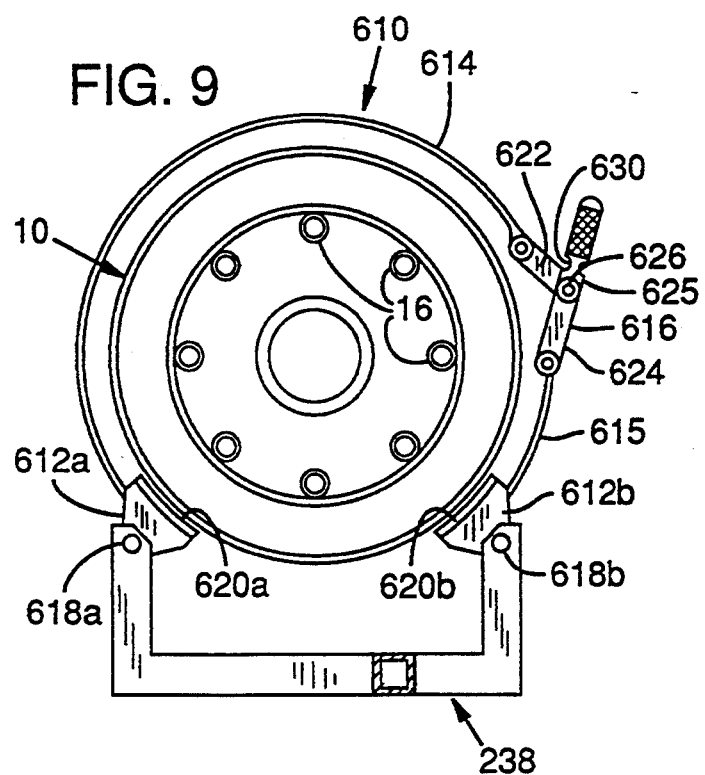

DEVICE FOR REMOVING BRAKE DRUM AND HUB ASSEMBLY

FIELD OF THE INVENTION

This invention is directed to a device for removing and carrying e brake drum and/or a hub assembly of a vehicle.

BACKGROUND OF THE INVENTION

The brake drum and the hub assembly of a vehicle require periodic inspection, maintenance and repair to function properly. The brake drum may be positioned inside the hub assembly (an "inboard" assembly) or outside the hub assembly (an "outboard" assembly). Inboard and outboard brake drum and hub assemblies are collectively referred to herein as assemblies. An assembly may weigh as much as 250 pounds, and hence it is difficult for a person to remove the assembly without suffering injury. Furthermore, once the assembly is removed it is difficult for one individual to move it from one location or position to another, or reattach it to the vehicle. This makes servicing the assembly difficult.

No prior devices have been designed specifically for removing and carrying brake drums and hub assemblies. However, devices are known for transporting and supporting objects of considerable weight. One such device is a hand truck. Moreover, hand trucks have been adapted for use with specific mechanical devices. For instance, Davis' U.S. Pat. No. 2,903,147 describes a hand truck, specifically designed to attach to outboard motors. The hand truck has a jack attached thereto for lifting the outboard motor.

Devices that attach to hand trucks for lifting objects also are known in the art. For instance, Moore's U.S. Pat. No. 5,123,666 describes an attachment for a two-wheeled hand truck that enables a person to lift and transport bulky items, such as folding chairs. The hand truck attachment includes support rods that extend outwardly from and are adjustably mounted to a rigid plate. These rods are designed only to support objects and not for attaching to and carrying a hub assembly.

SUMMARY OF THE INVENTION

The present invention is specifically designed to attach to and carry assemblies of vehicles, and is particularly suitable for use with large commercial vehicles including semi-trucks and tractors, buses, logging trucks, etc. However, the present invention also may be used with any vehicle having an assembly, including passenger automobiles. A device according to the present invention is quickly and easily attached to an assembly, regardless of the size of the assembly itself or the number of hub studs the assembly may have. The device comprises: a hand truck having an axis; attachment means or an attachment unit, connected to the hand truck, for attaching to the hub assembly; and lifting means, such as a jack, operably connected to the attachment unit for adjusting the vertical position of the unit along the axis of the hand truck.

A hand truck suitable for the present device comprises a frame having or defining a handle, and a base having a plurality of wheels and/or casters attached thereto. The frame also may include ground-engaging support members attached to a mid-portion thereof. The base typically includes arm members that terminate in an angular end portion. This end portion provides a flat angular surface upon which a person can place a foot when tipping the hand truck.

The attachment means are of two main types: (1) the attachment means engage studs on an exterior surface portion of the hub assembly (stud attachment means); or (2) the attachment means engage an exterior surface portion of the brake drum, the hub, or the entire assembly (assembly attachment means). Stud attachment means include, without limitation, hub stud clamps, hub stud engaging brackets, and hub stud engagement plates wherein each bracket and plate defines an aperture for receiving a hub stud. Assembly attachment means include, without limitation, assembly clamping means such as an adjustable engaging strap.

The attachment means may include a support frame to which the stud attachment means or the assembly attachment means are attached. The support frame may define a plurality of attachment plate receiving channels dimensioned to slidably receive an edge of an attachment plate. Hence, the attachment plates may be moved relative to each other within the receiving channels so that a distance d between centers of adjacent attachment-plate apertures can be adjusted. This allows the device to be adjusted from use with a first assembly having a first number of studs, such as 8 studs, to use with a second assembly having a second number of studs, such as 10 studs. Alternatively, the support frame may be removably attached to the lifting device so that a first support frame can be removed from the device and replaced with a second support frame, thereby changing the device from use with a first assembly to a second assembly.

An alternative embodiment of the attachment means comprises a bracket, operably connected to the lifting means, and a plurality of elongated assembly attachment rods having a first end thereof secured to the bracket. The attachment rods have attached to a second end thereof a stud attachment plate. The attachment plate defines an aperture dimensioned to receive a hub stud.

The bracket also includes a tubular portion through which the attachment rods pass. The portion of the attachment rod passing through this tubular portion can be adjusted before the attachment rods are secured to the bracket. Hence, the attachment rods are adjustably secured to the bracket so that a distance $d_1$, the distance of the bracket from the first hub stud attachment plate, can be increased or decreased independently of a distance $d_2$, the distance of the bracket from the second hub attachment-plate. Alternatively, both the bracket and the attachment rods may be removably attached to the device. Hence, a first bracket or set of rods can be removed and replaced with a second bracket or set of rods, thereby changing the device from use with a first assembly to a second assembly.

A first end of the jack itself may be pivotally attached to the hand truck. Alternatively, the jack may include an elongated support housing having a first end pivotally connected to the hand truck. An angle adjusting member is attached to a second end of the lifting device or the support housing. The angle adjusting member is for adjusting an angle, defined between an exterior surface portion of the hub assembly attachment unit and the longitudinal axis of the hand truck, by pivoting the lifting device or support housing about the first end that is attached to the hand truck.

The present invention also includes a method for removing an assembly, such as a brake drum and/or hub assembly, from a vehicle. The method first comprises raising a vehicle to an elevated position and removing at least one wheel of the vehicle to expose the assembly. A device is then placed adjacent to the assembly wherein the device comprises: (a) a hand truck; (b) lifting means having a first end that is pivotally attached to the hand truck; and (c) assembly attachment means operably connected to the lifting means. The device may further comprise an angle adjusting member attached to a second end of the lifting means for changing an angle defined between an exterior surface portion of the assembly attachment means and the axis of the hand truck.

The height of the assembly attachment means is adjusted to match the position of the assembly by actuating the lifting device. The angle presented by an exterior surface portion of the assembly attachment means is then adjusted to conform to an angle presented by an exterior surface portion of the assembly. This is done by actuating the angle adjusting member. Finally, the assembly attachment means are attached to the assembly and the assembly is then removed from the vehicle.

BRIEF DESCRIPTION OF THE DRAWINGS

FIG. 3 is a side view of the embodiment of FIG. 2.

FIG. 6 is a front view of an alternative embodiment of an assembly attachment unit.

FIG. 9 is a front view of an alternative embodiment of an assembly attachment unit.

FIG. 10 is a plan view of an engagement sleeve, support column and attachment member for the embodiment of FIG. 2.

DETAILED DESCRIPTION OF THE INVENTION

The present invention comprises a hand truck, a lifting device that is securely mounted to the hand truck, and an assembly attachment unit operably connected to the lifting device. The attachment unit can be selected for a particular task from a number of embodiments. Moreover, the height and angular orientation of the attachment unit are easily adjustable.

A. Hand Truck

Figure 1:
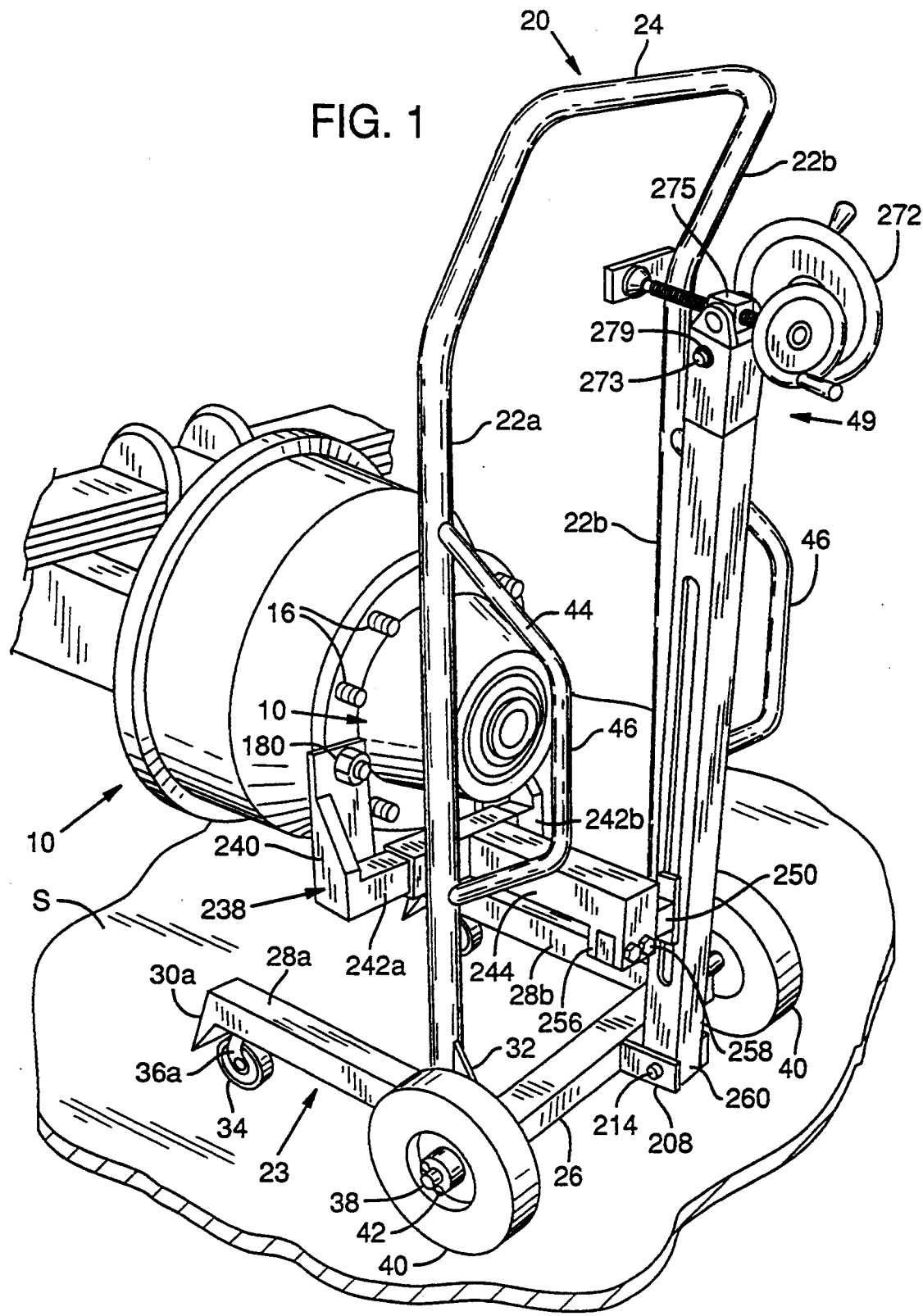
FIG. 1 is a perspective view of a device according to the present invention attached to an inboard assembly.
Figure 2:
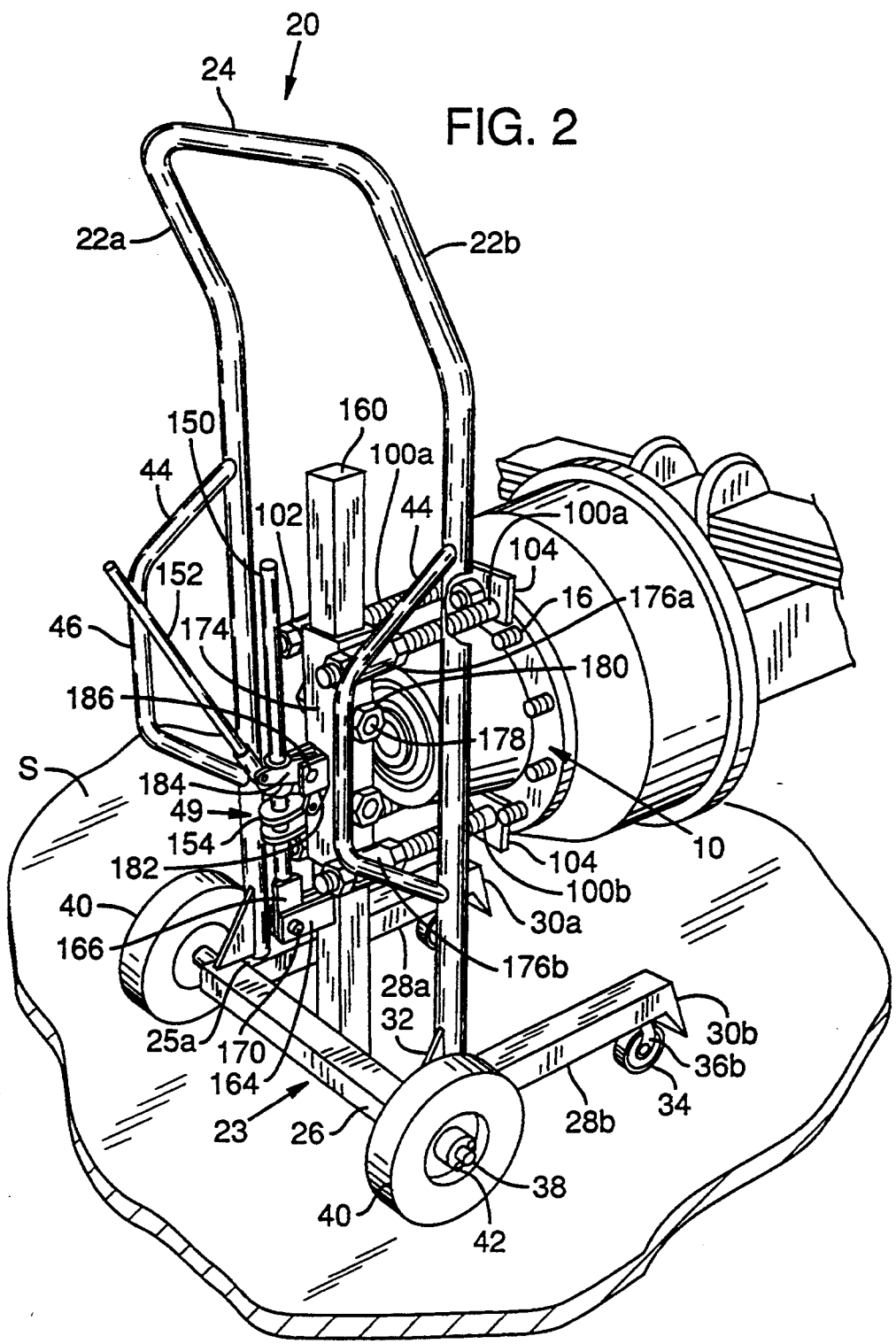
FIG. 2 is a perspective view of an alternative embodiment of a device according to the present invention attached to an inboard assembly.

FIGS. 1-3 illustrate a hand truck 20 having a frame member 22 and a base 23. The hand truck is a portable unit having: (a) an elongated, upright frame that defines the longitudinal axis of the hand truck, and the frame further includes or defines a handle; and (b) a base support that extends outwardly from the frame and carries a plurality of wheels and/or casters. A particularly suitable frame member 22 comprises an inverted, U-shaped metal frame having frame members 22a, 22b that extend along the direction of the longitudinal axis of the hand truck. A first, closed-end portion of frame members 22a, 22b defines a handle portion 24. Second open-end portion 25a, 25b (shown in FIG. 2) of frame members 22a, 22b, respectively, are attached to the base 23. The open-end portions of frame members 22a, 22b may be attached to the base 23 by any suitable means such as by (1) welding, (2) using fasteners such as screws, cotter pins and nuts and bolts, or (3) a combination of welding and fasteners. Welding is the preferred method of attaching the frame members 22a, 22b to the base 23.

As shown in FIGS. 1-3, frame members 22a, 22b extend upwardly from base 23 when the cart is in the illustrated upright position. Frame members 22a, 22b extend substantially perpendicular to a plane defined by the supporting surface upon which the base 23 of the hand truck rests. Although not critical to the present invention, a top portion of the frame members 22a, 22b may be angled away from a workpiece to form an operator's handle, as shown in FIGS. 1-3. A suitable angle for a top portion of frame members 22a, 22b is 29°.

The components of the hand truck are typically made of a sturdy metal, such as steel or aluminum. However, the material from which the components are made is not critical. Hence, such material might comprise a polymeric plastic material, for instance, as long as the material is sufficiently sturdy to support a hub assembly 10 or other component being transported by the cart. A preferred material for frame members 22a, 22b is 1 inch schedule black pipe. The shape of frame members 22a, 22b and handle portion 24 is achieved by bending the 1 inch schedule 40 pipe to the desired shape and then cutting the overall height of the frame to at least 3 feet, preferably about 3 feet, 6 inches. The height of the frame is preferably sufficient that a person standing in an upright position can readily grasp handle 24.

Base 23 includes cross member 26 that extends between and connects the free ends of upright frame members 22a, 22b. The remainder of the base is formed by arm members 28a, 28b which, in cooperation with cross member 26, forms a U-shaped support frame. Arm members 28a, 28b extend substantially perpendicular to cross member 26, and cooperatively define a support plane that is substantially perpendicular to the longitudinal axis of the hand truck 20. A plurality of ground-engaging casters 34 and wheels 40 are positioned beneath the support frame to provide mobility for the cart, as further described below.

The base portion 23 may be formed from a single piece of metal having substantially right-angle bends therein which correspond to arm members 28a, 28b. A particularly suitable material for the base 23 comprises 2 inches×2 inches×⅛ inch tube steel. However, a separate cross bar 26 and arms 28a and 28b also may be used. When a separate cross bar 26 is used, cross bar 26 and arm members 28a, 28b are cut to the desired length from the stock material. These pieces are then fastened together, such as by welding, to form the desired shape for base 23, such as the illustrated U-shaped support frame.

Transverse arms 28a and 28b include angularly disposed front-end portions 30a, 30b, respectively. Front-end portions 30a, 30b provide a flat, angled surface on which a foot may be placed to tip the device 20 toward the front-end portions, as shown in FIG. 3. Front-end portions 30a, 30b engage the supporting surface S and act as pivot points when the device is tipped. Thus, front-end portions 30a, 30b facilitate repositioning the assembly 10 when it is attached to the device 20, for example lowering assembly 10 to the support surface. However, front-end portions 30a, 30b are not critical to the operation of the invention, nor is the angle critical at which these front-end portions 30a, 30b are positioned.

FIGS. 1 and 2 also show gusset plates 32 that are connected along one edge of the plate to frame members 22a, 22b, and along a second edge of the plate to the abutting ends of cross member 26 and transverse arm members 28a, 28b. Gusset plates 32 provide increased structural support to the hand truck 20. A preferred support plate 32 is made from 3/16 inch steel plating. Support plates 32 can be attached to the frame members 22a, 22b and base 23 by any suitable means, such as welding.

It is preferable that the hand truck be mobile and easily moved from location to location. Hence, the base 23 may have attached thereto casters 34 and/or wheels 40. The embodiments illustrated in FIGS. 1-3 include both casters 34 and wheels 40. Two casters 34a, 34b typically are mounted on the support arms 28a, 28b near the distal ends thereof adjacent front-end portions 30a, 30b. Casters 34a, 34b are mounted to arms 28a, 28b, respectively, using caster wheel support brackets 36a, 36b. Brackets 36a, 36b are attached to transverse arm members 28a, 28b with fasteners or by welding. As shown in FIGS. 1 and 2, a particularly suitable embodiment also includes two 8 inch wheels 40 that are attached to axle 38 using two standard washers (not shown) and cotter pin 42. When wheels 40 are desired, an aperture is provided through cross bar member 26 for receiving axle 38, which extends through cross bar 26 and typically is made from ⅜ inch cold rolled steel.

When supporting an assembly 10, the device 20 may have casters 34 and wheels 40 engaging the ground for ready transportation. However, it is often desirable to reposition the assembly 10 for inspection and/or repair when it is attached to device 20. This is illustrated in FIG. 3 wherein frame 22 includes two substantially trapezoidal or C-shaped, ground-engaging support members 44. Support members 44 typically have at least one bend therein which forms a ground-engaging portion 46. Member 44 may include two substantially right-angle bends therein so that portion 46 is substantially parallel to frame members 22a, 22b. Alternatively, member 44 may include more than two bends therein so that the ground-engaging portion 46 extends even farther from frame member 22. Thus, the distance of the portion 46 from the frame members 22a, 22b can be varied. It is preferred that this distance be sufficient so that the portion 46, when engaging the supporting surface, prevents the handle 24 from contacting the supporting surface. This allows a person to grasp the handle 24 to move the device 20 to an upright position. A particularly suitable distance for portion 46 from frame member 22 has been found to be about 6-7 inches. A particularly suitable embodiment of member 44 is made from a ⅜ inch diameter steel bar and is attached to frame 22 by welding.

B. Lifting Device and Support Member

A lifting device 49 is securely attached to the hand truck. The lifting device 49 allows vertical repositioning of the assembly along the longitudinal axis of the frame 22. As used herein, the term lifting device or lifting means refers to any device that can: (a) attach to, or be adapted to attach to, both a hand truck and an assembly attachment unit; and (b) lift the weight of an assembly to a variety of positions and thereafter support the assembly. As shown in FIGS. 1-3, a particularly suitable embodiment of the present invention includes a standard lifting jack as lifting device 49. One lifting jack useful for the present invention is a BILSTEIN DBP Volkswagen jack (FIG. 2). A second jack particularly suitable for the present invention is shown in FIG. 1 and comprises a screw lift jack, Model No. 190, from the Hammerblow Corporation of Wausau, WI. However, one skilled in the art will realize that any suitable jack will suffice as lifting device 49, and the present invention is not limited to the jacks specifically discussed herein.

I. BILSTEIN DBP Jack, Support Rod and Attachment Bracket

As shown in FIG. 2, the BILSTEIN DBP lifting jack 49 typically includes a center support rod 150 and a jack handle or lever 152. Lifting jack 49 also includes two plates 154 having aligned holes therethrough. Rod 150 passes through these holes. When the plates 154 are in a locked position, they are prevented from moving relative to the center support rod 150. By actuating the jack handle lever 152, a person can adjust the position of the plates 154 along center support rod 150.

The hand truck also includes a center support bar 160 (FIG. 2) to which jack 49 is mounted. One embodiment of the present invention has support bar 160 attached to cross member 26 by any suitable means such as fasteners or welding. A particularly suitable center bar 160 comprises a steel member having dimensions of about 2 inches×2 inches×⅛ inch×2 feet 6 inches. As shown in FIG. 2, the center support bar 160 may extend between and parallel to the frame members 22a, 22b. Alternatively, the support bar 160 may be positioned closer to one frame member than another, such as closer to frame member 22b as shown in FIG. 1. A preferred embodiment of the present invention has support bar 160 positioned closer to one frame member 22. This provides easier access to the assembly 10 when the assembly 10 is attached to the device 20.

The embodiment of FIG. 2 has lifting device 49 secured to center support bar 160 using an attachment bracket. A suitable bracket has two side plates 164, each plate 164 having a hole therethrough. The lifting device 49 includes an attachment plate 166 which also has a hole therethrough. Plate 166 is positioned between side plates 164 so that the hole through attachment plate 166 is aligned with the holes through side plates 164. Attachment pin 170 then is inserted through the side plates 164 and the attachment plate 166 to secure the lifting device 49 to center support bar 160.

The lifting device 49 also must be operably connected to the assembly attachment portion of the device 20 to provide vertical adjustment capability. The embodiment illustrated in FIG. 2 uses a substantially square or rectangular elongated bar-engaging sleeve 174. Sleeve 174 surrounds and slides upon bar 160, thereby providing motion relative to support bar 160. Hence, the inner dimensions of the sleeve 174 are just slightly greater than the outer dimensions of bar 160 as shown best in FIG. 10. A particularly suitable embodiment of engaging sleeve 174 comprises a steel rectangular sleeve having dimensions of about 2-½ inches×2-½ inches×¼ inch×1 foot.

The lifting device 49 is attached to sleeve 174 using an attachment bracket comprising two side plates 182 which may be directly attached, such as by welding, to sleeve 174. Bracket side plates 182 have holes therethrough that are aligned with a hole on a lifting device attachment plate 184. Attachment plate 184 is positioned between side plates 182 with the hole through plate 184 being aligned with the holes through the side bracket plates 182. Pin 186 is inserted through these holes to secure the lifting device to sleeve 174.

As shown in FIGS. 2 and 10, rod-engaging sleeve 174 may have attached thereto a plurality of tubular receiving members 176. A particularly suitable embodiment includes two tubular members 176a connected to a first, upper end of sleeve 174, and two tubular members 176b connected to a second, opposite end of sleeve 174. Tubular members 176a, 176b may, for example, be connected to sleeve 174 by welding.

Also provided on support sleeve 174 are nut retaining studs 178. Nut retaining studs 178 are not critical to the function of the invention. Rather, studs 178 are provided for convenience and are used to hold nuts 180 that are sized to be received on studs 16 of assembly 10. Both right-handed and left-handed nuts 180 are typically retained on studs 178, thereby accommodating right-handed and left-handed threads on studs 16.

II. Screw Jack and Support Rod

Figure 4:
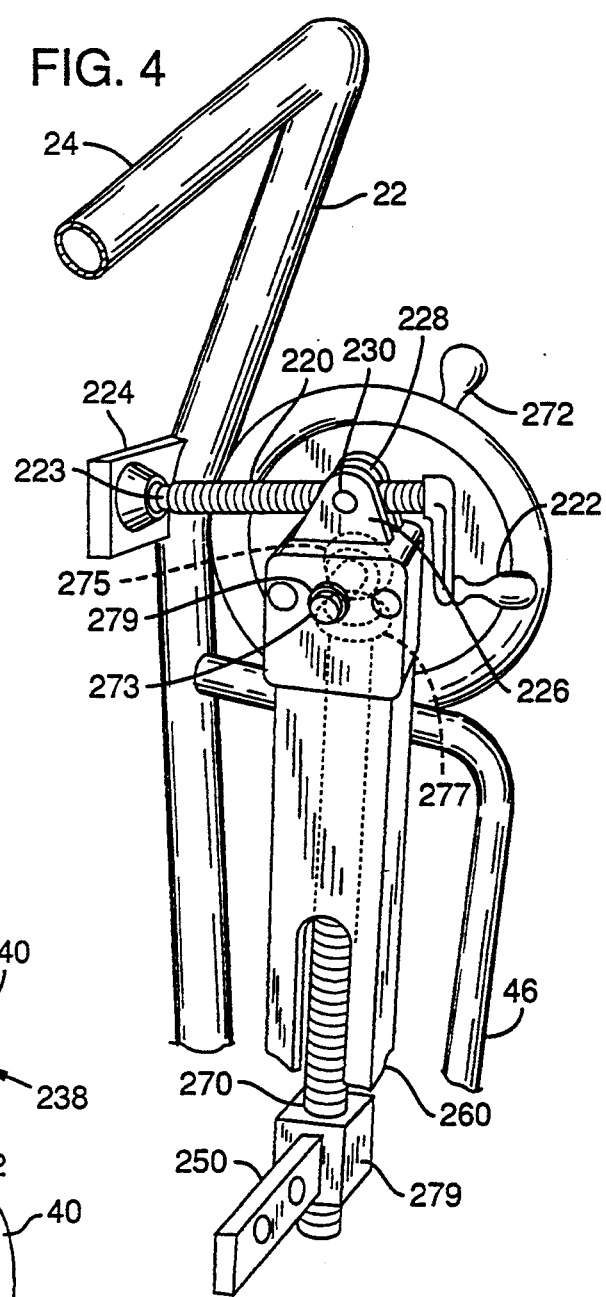
FIG. 4 is a side view of an angle adjusting member and screw jack for the device of FIG. 1.

As shown in FIGS. 1 and 4, the screw lift 49 is housed inside a support housing 260 that is positioned closer to frame member 22b than member 22a. Support housing 260 is preferably pivotally attached to cross member 26. One method of attaching housing 260 is by using an attachment bracket comprising two side plates 208. Side plates 208 typically have holes (not shown) therethrough that align with an aperture (not shown) through a bottom portion of support housing 260. Attachment pin 214 is inserted therethrough to attach the housing 260 to the device 20. Alternatively, housing 260 may have attached to a bottom portion thereof a tubular attachment bracket (not shown) having an aperture therethrough. Attachment pin 214 is inserted through the tubular attachment bracket and the plates 208 to secure housing 260 to the device 20.

The screw lift 49 includes a screw drive actuating handle 272 that is connected to a drive shaft 273. This drive shaft 273 extends through an aperture defined by a first bevel gear 275 and through an upper portion of the wall of support housing 260. Drive shaft 273 is secured to the support housing 260 using a bushing (not shown) and a snap ring 279. Bevel gear 275 operably engages a second bevel gear 277 that is oriented at 90° relative to bevel gear 275. Bevel gear 277 is attached to the top of screw rod 270 using an attachment pin (not shown). Alternatively, a separate housing may be attached to the top of support housing 260 for housing the bevel gears 275, 277 and drive shaft 273. A separate housing may be made from the same material with the same dimensions as support housing 260, or from a different material having different dimensions.

Screw rod 270 passes through a threaded nut 279. By rotating the screw rod 270, the nut 279 can be raised or lowered along the screw rod 270. Hence, a person can raise and lower the nut 279 along the screw rod 270 by turning handle 272. A plate 250, having at least one hole therethrough, is attached to the nut 279. This attachment plate 250 extends transversely from the nut 279 and passes through a channel in the side of support housing 260.

Figure 5:
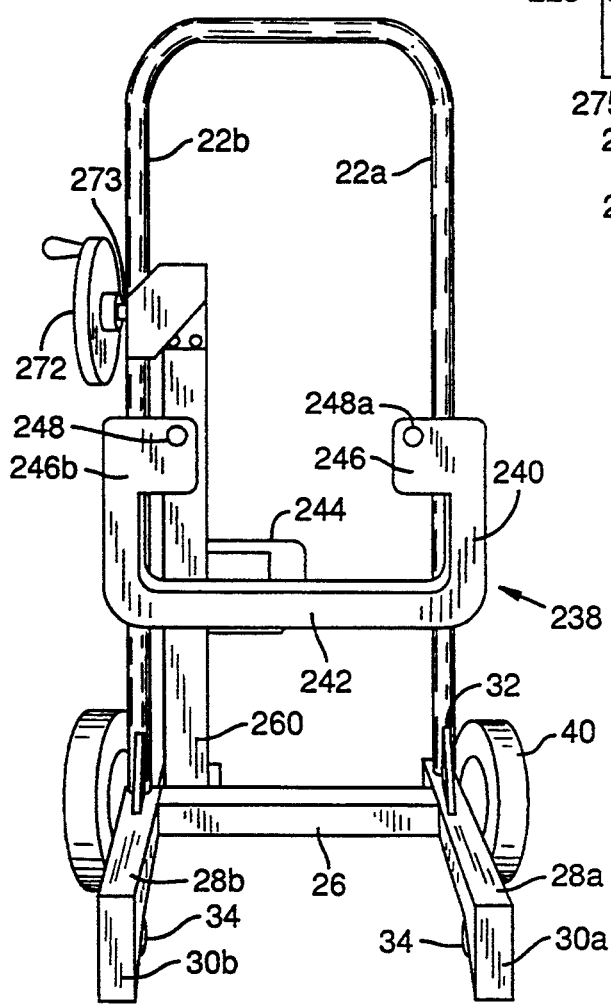
FIG. 5 is a front view of the embodiment of FIG. 1.

As shown best in FIGS. 1 and 5, a U-frame 238 is operably connected to the screw lifting device 49. The U-frame 238 includes upwardly extending arms 240 and cross bar 242. Arms 240 and cross bar 242 may be one piece with arms 240 formed by right-angle bends in cross bar 242. Alternatively, arms 240 may be separate pieces that are attached to cross bar 242. Furthermore, cross bar 242 may comprise an insert portion 242a and a sleeve portion 242b (FIG. 1) whereby the length of cross bar 242 (i.e., the distance between arms 240) can be adjusted by changing the relative positions of members 242a and 242b. A preferred material for making the U-frame 238 comprises 2 inches × 2 inches × ¼ inch steel tubing, cut and welded into the final shape.

Attachment member 244 is welded to a back surface portion of cross bar 242. Member 244 provides a means for attaching the U-frame 238 to the screw lifting device 49. Attachment member 244 can be substantially linear; however, a preferred embodiment of member 244 is substantially L-shaped. Attached to a bottom surface portion of the attachment member 244 are two downwardly depending bracket plates 256. These bracket plates 256 define aligned apertures therethrough. Furthermore, the bracket plates 256 are spaced sufficiently one from the other to receive attachment ]3late 250, connected to nut 279, therebetween. Pins or attachment bolts 258 then are used to secure the U-frame 238 to the attachment-plate 250. U-frame 238 is therefore operably and removably connected to the lifting device 49, and the U-frame 238 can be raised or lowered as desired by actuating handle 272. Hence, the device 20 can be adapted for use with either a 10-stud or an 8-stud assembly by removing bolts 258 and replacing one U-frame 238a, useful for a 10-stud assembly, with a U-frame 238b useful for an 8-stud assembly.

As shown best in FIG, 4, an angle adjusting unit is attached to a top end portion of support housing 260. This angle adjustment unit comprises an elongated threaded rod 220 having a first end attached to a handle 222 and a second end attached to a swivel bearing 223. The angle adjusting unit is secured to the housing 260 using an attachment bracket. The attachment bracket includes two side walls 226 that are welded to the top of housing 260. Side walls 226 define apertures therethrough. Opposite sides of a threaded nut 228 are drilled and tapped. Nut 228 then is positioned between side walls 226 so that the threaded apertures therethrough are aligned with the apertures through side walls 226. Nut 228 is loosely secured in this position with screws 230. A second end of rod 220 is threaded through the threaded aperture of nut 228 and is rigidly secured, such as by welding, to swivel bearing 223. Swivel bearing 223 is received in an aperture defined in plate 224 and is free to rotate within this aperture. Plate 224 is rigidly secured, such as by welding, to frame member 22. Hence, by rotating handle 222, threaded rod 220 is rotated, as is swivel bearing 223. Rotating rod 220 may, for instance, draw a top portion of housing 260 closer to frame member 22, thereby changing the angle between a plane defined by an exterior major surface of member 260 and the axis of the frame 22.

C. Hub Assembly Attachment Members

The present invention includes attachment means (attachment member or unit) for attaching the device 20 to either an inboard or outboard assembly 10. The attachment member may conform to the shape of the assembly, thereby allowing the attachment member to securely attach to the assembly. For instance, if attachment plates or brackets are used, then such plates or brackets have surfaces which allow them to attach to the assembly. If an assembly engaging strap is used, then the strap is dimensioned to attach to the assembly and is pliable enough to conform to the brake drum and/or hub assembly, thereby allowing the strap to securely attach to the assembly.

I. First Embodiment

One embodiment of the attachment unit is shown in FIGS. 2-3, and 10. This first embodiment of the attachment unit comprises a plurality of threaded rods 100. A particularly suitable number of rods for this first embodiment of the attachment unit is four threaded rods 100 arranged in two groups of two. Two threaded rods 100a are passed through two tubular receiving members 176a on an upper portion of sleeve 174. The remaining two threaded rods 100b are passed through two tubular receiving members 176b attached to a bottom portion of sleeve 174.

Four nuts 102, sized to mate with threaded rods 100, are used to secure threaded rods 100 to sleeve 174. For instance, a first set of nuts 102a are threaded on rods 100a before rods 100a are inserted through tubular receiving members 176 (FIG. 10). These nuts 102a determine the distance d that rods 100a extend from device 20. After rods 100a are inserted through the tubular receiving members 176, a second set of nuts 102b are threaded onto a first end of rods 100a to secure them in position.

Attached to a second end of each pair of threaded rods 100 is a stud attachment plate 104. Attachment plate 104 has a hole therethrough dimensioned to receive studs 16. Studs 16 are arranged on an exterior surface of the assembly 10, typically in a circular pattern. A stud 16a on the assembly 10 passes through a hole through plate 104a. Similarly, a stud 16b is inserted through plate 104. Studs 16a, 16b may be diametrically positioned on the exterior surface of the assembly 10, or may be positioned at an angle less than or greater than 180°.

A typical assembly 10 has ten studs 16. However, all the embodiments of the present invention also are useful for assemblies having various other numbers of studs, such as five-eight studs. One main difference between assemblies having different numbers of studs is the distance between the centers of adjacent studs 16a and 16b. The distance between the centers of studs 16a and 16b may vary from about 8 inches to 12 inches. This first embodiment of the present invention is readily adaptable for use with assemblies 10 having different numbers of studs by varying the distance between the centers of the holes through plates 104a and 104b. One way to change this distance is to use a second sleeve 174 that has a different distance between tubular members 176 than does a first sleeve 174.

A front surface portion of attachment plates 104a and 104b define a plane that is substantially perpendicular to the horizontal plane defined by a supporting surface if the plates 104a and 104b are substantially aligned one above the other. That is, if a distance $d_1$, which is the distance of plate 104a from frame member 22, equals the distance $d_2$, the distance of plate 104b from the frame 22, then the exterior surface portions of plates 104a and 104b define a plane that is substantially perpendicular to a horizontal plane defined by the supporting surface. However, if $d_1$ does not equal $d_2$, then the plane defined by the exterior surfaces of plates 104a and 104b is not substantially perpendicular to the supporting surface S. The distances $d_1$ and $d_2$ can be changed independently by adjusting the position of nuts 102a, 102b on threaded rods 100a, 100b. Hence, a person can change the angle presented by the exterior surfaces of attachment plates 104a, 104b to correspond to the angle presented by the exterior surface of the assembly 10.

II. Second Embodiment

A particularly suitable device 20 for the present invention is shown in FIG. 1. This embodiment includes the hand truck described above and lifting device 49 manufactured by the Hammerblow Corporation of Wausau, WI. Housing 260 is preferably positioned closer to one frame member, such as 22b as shown in FIG. 1, than the other frame member.

As shown in FIGS. 1 and 5, the attachment member comprises U-frame 238 having upwardly extending arms 240 and cross bar 242. As shown best in FIG. 5, upwardly extending arms 240 of the U-frame have attached thereto plates 246a and 246b, having holes 248a and 248b therethrough, respectively. Holes 248a and 248b are dimensioned to receive the studs 16a and 16b of assembly 10. Studs 16a and 16b are passed through holes 248a, 248b, and the assembly 10 then is secured to the device 20 by threading nuts 180 over the studs 16.

The centers of holes 248a and 248b are separated by a distance d. A particularly suitable distance d is 11-¼ inches (for a 10-stud assembly) and 8-⅝ inches (for an 8-stud assembly). As discussed above, distance d can be changed to attach the device to hub assemblies 10 having various numbers of studs. One method of adjusting the distance d for the present embodiment is to removably attach the U-frame 238 to the device 20 using any suitable means such as fasteners 258 as discussed above. Alternatively, the U-frame 238 itself can be made sizably adjustable. One skilled in the art will realize that cross bar 242 could comprise a two-piece unit having an insert 242a and a sleeve 242b. A first stud plate 246a would be attached to the insert 242a and a second plate 246b would be attached to the sleeve 242b. Hence, the distance d between the center of plate holes 248a and 248b could be adjusted by adjusting the position of insert 242a relative to the position of sleeve 242b.

Several alternative embodiments of the assembly attachment unit are shown in FIGS. 6-9. These alternative embodiments use the hand truck 20, screw lifting device 49, and U-frame 238 described above. However, with these alternative embodiments, plates 246a, 246b are replaced with the various attachment means described below.

III. Third Embodiment

A third preferred embodiment of an attachment unit useful for the present invention is illustrated in FIG. 6. This embodiment is a preferred embodiment because it eliminates the need to use nuts 180 to attach the device 20 to the hub assembly 10. FIG. 6 shows an attachment unit comprising a handle 302, threaded rod 304 that passes through threaded nut 306, toggle pad 308, swivel bearing member 309, and a stud engaging bracket 310 that is received in a sliding channel 312. Bracket 310 may comprise a metal plate, such as a steel plate, having formed therein a stud receiving channel 314. Receiving channel 314 is dimensioned to receive studs 16 on an assembly 10. Only the bracket 310 is required for the third preferred embodiment to attach to the hub 16 of an assembly 10. However, this third embodiment also may include a bracket 310 having a mating plate 311. Plate 311 defines a channel 313 that is positioned and dimensioned to define, in conjunction with channel 314, an aperture for receiving a stud 16.

Provided in main U-frame 238 is a bracket receiving channel 312 that is dimensioned to receive an edge 316 of bracket 310. Bracket 310 can be moved in channel 312, and hence into contact with a stud 16, by rotating handle 302. Handle 302 is attached to threaded rod 304. An end portion 307 of threaded rod 304 is attached, such as by welding, to swivel bearing 309. Bearing 309 is free to rotate in a semi-spherical depression or socket 315 formed in toggle pad 308. Hence, swivel bearing 309 and the socket 315 of toggle pad 308 function as a ball-and-socket joint. Toggle pad 308 is securely attached, such as by welding, to member 310. Hence, by rotating the handle 302, bracket 310 can be positioned in channel 312 to encompass stud 16. By rotating handle 302 in the opposite direction, bracket 310 can be drawn away from and out of encompassing engagement with the stud 16.

IV. Fourth Embodiment

Figure 7:
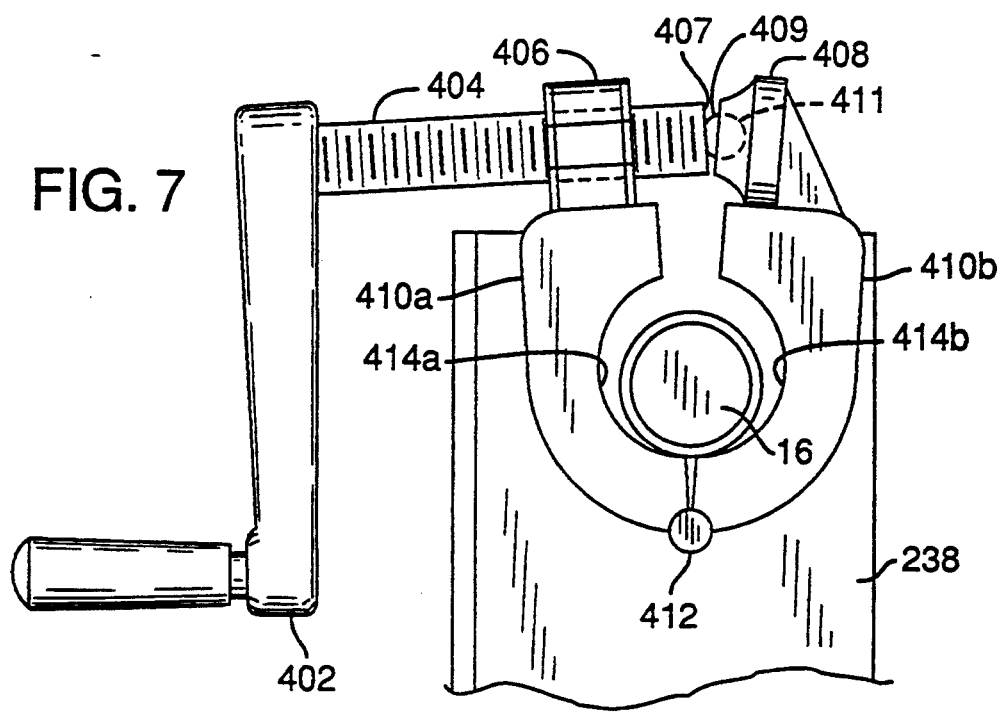
FIG. 7 is a front view of an alternative embodiment of an assembly attachment unit.

A fourth alternative embodiment for attaching device 20 to the studs 16 of assembly 10 is shown in FIG. 7. Two units as shown in FIG. 7 are attached to U-frame 238. This embodiment comprises a handle 402, threaded rod 404, mounting nut 406, toggle pad 408, swivel bearing 409, and two substantially semi-circular or C-shaped stud engaging members 410 that are attached at a pivot joint 412. Each stud engaging member 410a, 410b defines a semi-circular stud engaging surface 414a, 414b, respectively. Hence, stud engaging members 410a, 410b together define an aperture through which stud 16 may pass.

An end portion 407 of threaded rod 404 is attached, such as by welding, to swivel bearing 409. Bearing 409 is free to rotate in a semi-spherical depression or socket 411 formed in toggle pad 408. Hence, swivel bearing 409 and the socket of toggle pad 408 function as a ball-and-socket joint. Toggle pad 408 is securely attached, such as by welding, to member 238. Hence, to attach this fourth alternative embodiment to a hub assembly 10, studs 16a and 16b are placed between two pairs of symmetrical members 410a, 410b. Crank handle 402 is then rotated to draw the stud engaging members 410a and 410b together, thereby engaging a stud, such as stub 16a, by rotation about pivot joint 412. Members 410a and 410b are tightened about studs 16 until such time as the device of the present invention is securely attached to the assembly 10.

V. Fifth Embodiment

Figure 8:
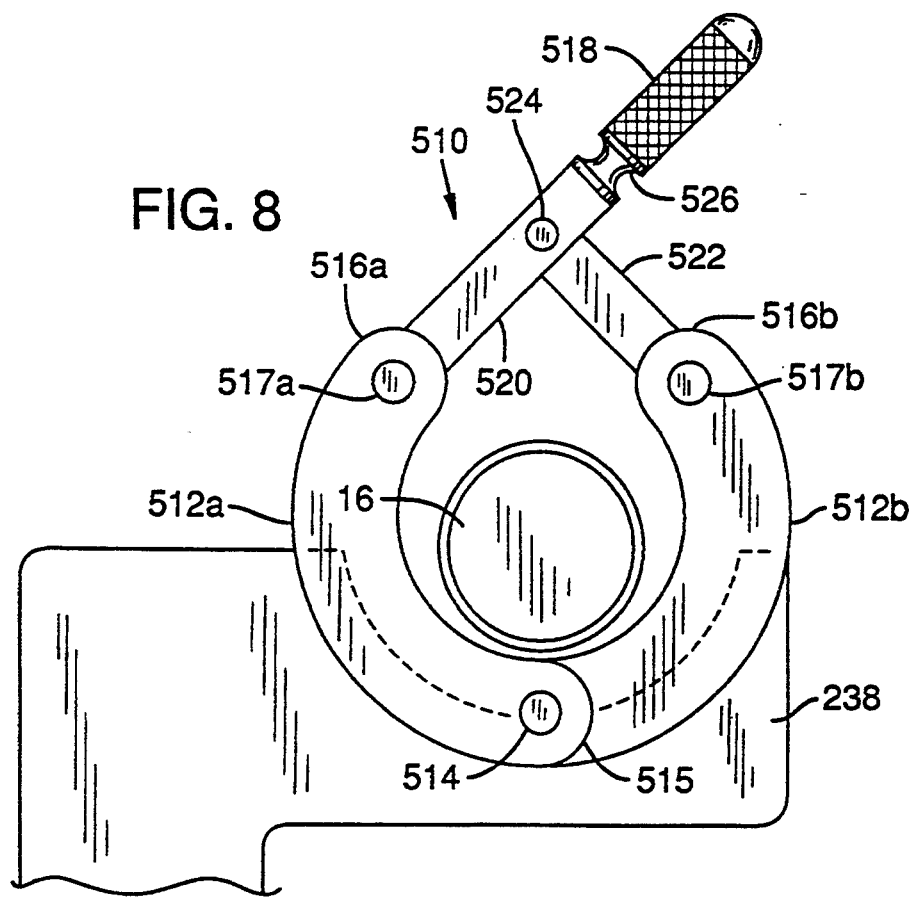
FIG. 8 is front view of an alternative embodiment of an assembly attachment unit.

A fifth alternative embodiment of the attachment member is shown in FIG. 8 and includes a plurality of hub clamping members 510. These hub clamping members include two identical, substantially semi-circular or C-shaped stud-engaging members 512a, 512b. Members 512a and 512b are connected one to the other by a fastener 514, such as a screw or pin, at a pivot point 515. Ends 516a, 516b of members 512a, 512b, respectively, are attached to a latch 518 using fasteners 517a, 517b, such as screws or pins. Latch 518 includes two arm members 520 and 522 that are connected one to the other at a pivot point by a fastener 524, such as a screw or pin. Latch 518 is free to rotate about the pivot point.

To attach this assembly attachment unit to a stud 16, the stud 16 is passed through the stud-engaging aperture defined by the semi-circular members 512a and 512b. By rotating latch 518, a person can draw members 512a and 512b together by rotation about the pivot point. Latch 518 is rotated until the semi-circular members 512 engage the stud 16. Latch 518 then is secured against movement that would tend to release the hub 16 from engagement. Latch 518 may include means for locking latch 518 in position once semi-circular members 512a, 512b securely engage stud 16. For instance, notch 526 may engage a latch securing pin (not shown) so as to secure latch 518 in position.

VI. Sixth Embodiment

A sixth alternative embodiment of the attachment mechanism is shown in FIG. 9. This embodiment engages an entire inboard or outboard assembly 10, rather than engaging a plurality of studs 16 on the assembly. The assembly engaging unit is itself attached to main U-frame member 238. The assembly engaging unit includes at least two pivot saddles 612a, 612b, hub assembly engaging straps 614 and 615, and a latch 616. Pivot saddles 612a and 612b may be connected to the main U-frame 238 by any suitable means. The pivot saddles 612a and 612b illustrated in FIG. 9 are connected to main U-frame 238 using attachment pins 618a, 618b, respectively. Pivot saddles 612a, 612b include substantially semi-circular, hub-engaging surface portions 620a, 620b.

A first end of strap 614 is securely attached to saddle 612a by any suitable means. An opposite end of strap 614 is attached to arm member 622 of latch 616. A second strap 615 connects arm member 624 of latch 616 to saddle 612b. The circumference defined by straps 614, 615 and intermediately disposed latch 616 is sufficient to encircle an assembly 10. Straps 614 and 615 may comprise any suitable material that will support and engage the hub assembly 10. For instance, straps 614 and 615 may comprise, without limitation, a metal strap, such as a steel or aluminum strap, a strap made from a polymeric plastic material, or a strap made from webbing, such as woven-cloth webbing.

Adjustable latch 616 includes the two arm portions 622 and 624. Arm members 622 and 624 are pivotally connected at a pivot point one to the other by an attachment fastener 626, such as a pin or screw. Hence, latch 616 can pivot about the pivot point, thereby drawing straps 614 and 615 about the assembly 10. Thus, a person can secure the device 20 to the assembly 10 by rotating adjustable latch 616 about fastener 626 until straps 614 and 615 securely engage the assembly 10. Thereafter, latch 616 is secured in position to prevent the strap from disengaging assembly 10. One possible means of securing latch 616 in position is by using notch 630 on latch 616. Notch 630 can engage an attachment pin (not shown) in order to secure the latch 616 in position once the straps 614 and 615 securely engage the assembly.

D. Using the Device for Removing, Supporting And Transporting an Assembly

To use the present invention, a vehicle is raised to an elevated position and the wheels are removed. Thereafter, the nuts securing the axle cap to the hub assembly are removed. Once the nuts are removed, the axle, spindle nuts and seal can be detached from the vehicle. These preliminary steps expose and disconnect assembly 10 from the vehicle. The device 20 is then attached to the assembly 10 as discussed below. Alternatively, the assembly 10 may be removed by: taking a wheel off the vehicle and raising the vehicle to an elevated position; attaching the device 20 to the assembly 10 as discussed below; removing the nuts securing the axle cap to the assembly 10; and detaching the axle, spindle nuts and seal from the vehicle.

Once the preliminary steps are completed, a person positions the device 20 adjacent to the assembly 10. The position of the assembly attachment unit along the axis of the hand truck is adjusted using lifting device 49, thereby correctly aligning the attachment unit with the assembly 10. The distance $d_1$ and the distance $d_2$ (the distance of the plates 104a, 104b from the frame member 22) then are adjusted so that the angle presented by the attachment plates 104a, 104b correspond to the angle presented by the exterior surface of the assembly 10. Alternatively, angle is adjusted using the angle adjusting member described above so that the angle presented by the assembly attachment unit corresponds to the angle presented by the exterior surface portion of the assembly 10. The attachment unit then is attached to the assembly 10 as discussed above for each of the alternative embodiments. Once the assembly attachment unit is securely attached to the assembly 10, a person thereafter removes the assembly 10 simply by wheeling device 20 away from the vehicle.

As illustrated in FIG. 3, the device 20 can be used to transport and/or reposition the detached assembly 10 for inspection and repair. For instance, if a person needs to inspect an interior portion of the assembly 10, the person can position himself behind the device 20 with the arms 28a and 28b extending away from the person. By placing a foot upon cross bar 26 and grasping handle 24, a person can tip the device 20 and attached assembly 10 towards him until the substantially trapezoidal or C-shaped members 44 contact the supporting surface. Members 44 extend from frame member 22 a sufficient distance so that handle 24 does not contact the ground when members 44 are in contact with the supporting surface. Thus, with supporting members 44 engaging the supporting surface, a person can place his or her hands underneath the handle 24 and lift the device 20 back to a vertical position.

Alternatively, to inspect an exterior portion of the assembly 10 a person can place a foot upon a front-end portion 30a or 30b while grasping handle 24 and tipping the entire device 20 and attached assembly 10 towards the person. Such tipping eventually causes the front-end portions 30a, 30b to contact the ground. Thereafter, front-end portions 30a, 30b act as pivot points about which the device 20 can be tipped. Thus, front-end portions 30a, 30b facilitate the positioning of the device 20 and attached assembly 10. Assembly 10 eventually contacts the supporting surface, and thereafter supports the device 20 and attached assembly 10.

To reattach the assembly 10, a person positions the device 20 with attached assembly 10 adjacent the vehicle. The position of the attachment unit along the axis of the hand truck and the angle of the exterior surface portion of the assembly 10 must be adjusted if these parameters have changed since the assembly 10 was disconnected. A person adjusts the height using the lifting device 49, and adjusts the angle of the attached assembly 10 either by changing the relative positions of the pairs of rods 100a, 100b, or by using the angle adjustment mechanism described above. The assembly 10 is wheeled towards the vehicle until it engages the assembly. The assembly 10 is then reattached by reversing the order of the steps described above for detaching the unit.

The device according to the present invention has been shown and described with reference to preferred embodiments. However, it should be obvious to one of ordinary skill in the art that modifications or changes may be made to the device while keeping within the scope of the invention as defined in the following claims:

We claim:

1. A device for attaching to and carrying a brake drum and/or hub assembly of a vehicle, comprising:
   an elongated handle portion extending away from a support base, the elongated handle portion defining the longitudinal axis of the device;
   an attachment member which is adjustable to conform to brake drum and hub assemblies having various dimensions, number of studs and spacing between studs and is capable of securely attaching thereto; and
   a lifting device, mounted on the device, that moves the attachment unit towards and away from the base along the longitudinal axis.

2. A device for attaching to and carrying a brake drum and/or hub assembly of a vehicle comprising:
   a hand truck having a longitudinal axis;
   a jack that is attached to the hand truck; and
   an attachment unit that is adjustable to conform to hub assemblies having various dimensions, number of studs and spacing between studs and which securely attaches to the assembly, the attachment unit being operably connected to the jack whereby actuating the jack moves the attachment unit along the longitudinal axis of the hand truck.

3. The device according to claim 2 wherein the jack includes an elongated support housing having a first end pivotally connected to the hand truck.

4. A device for attaching to and carrying a brake drum and/or hub assembly of a vehicle comprising a hand truck having an axis, a jack that is attached to the hand truck, and an attachment unit that securely attaches to the assembly which includes a plurality of studs, the attachment unit comprising at least one stud attachment plate wherein the attachment plate defines an aperture dimensioned to receive a stud, the attachment unit being operably connected to the jack whereby actuating the jack moves the attachment unit along the axis of the hand truck.

5. The device according to claim 4 wherein the attachment unit further defines at least one attachment plate receiving channel dimensioned to receive an edge of an attachment plate.

6. The device according to claim 5 wherein the attachment unit comprises a plurality of attachment plates slidably mounted in a plurality of receiving channels.

7. The device according to claim 6 wherein aperture centers of adjacent attachment plates are separated by a first distance wherein the first distance can be changed to a second distance by moving at least one attachment plate in the receiving channel relative to the adjacent attachment plate, thereby adjusting the device from use with a first assembly having studs separated by the first distance, to use with a second assembly having studs separated by the second distance.

8. The device according to claim 7 wherein the distance can be adjusted from about 8 to about 12 inches.

9. The device according to claim 2 wherein the attachment unit is removably attached to the jack so that a first attachment unit can be removed from the device and replaced with a second attachment unit, thereby changing the device from use with a first assembly to a second assembly.

10. A device for attaching to and carrying a brake drum and/or hub assembly of a vehicle, the hub assembly including a plurality of studs, the device comprising a hand truck having an axis, a jack that is attached to the hand truck, and an attachment unit, the attachment unit comprising at least one stud clamp attached thereto for securely clamping a stud.

11. The device according to claim 2 wherein the attachment unit further comprises an assembly clamp for securely clamping the assembly.

12. The device according to claim 11 wherein the assembly clamp further comprises an assembly engaging strap that is connected to the support frame and can be tightened about the assembly, thereby securing the assembly to the device.

13. The device according to claim 2 wherein the hand truck further includes a base having a jack support rod attached thereto and the attachment unit further comprises:
   an elongated tubular bracket defining an aperture therethrough dimensioned to removably receive the support rod, the tubular bracket having a first end and a second end; and
   a plurality of elongated assembly attachment rods having a first end attached to the bracket, the attachment rods having at least one stud attachment plate secured to a second end thereof wherein the stud attachment plate defines an aperture dimensioned to receive a stud.

14. The device according to claim 13 including at least a first and second attachment plate and wherein the attachment rods are adjustably mounted to the bracket so that a distance $d_1$ from the bracket of the first stud attachment plate can be increased or decreased independently of a distance $d_2$ from the bracket of the second attachment plate.

15. The device according to claim 2 wherein the hand truck includes a frame and the frame includes at least one ground-engaging support member that provides a surface for supporting the device wherein the support member extends, farther than any other component of the device, perpendicular to and beyond a plane defined by the frame along the axis of the hand truck.

16. The device according to claim 2 wherein the hand truck includes a base that defines a plane and the device further comprises a plurality of elongated arm members, a first end of the arm members being attached to the base and a second opposite end of the arm members terminating in an end portion that is angularly disposed relative to the plane.

17. The device according to claim 3 wherein the device further includes an angle adjusting member comprising:
   an elongated threaded rod having a first end and a second end wherein the first end is pivotally attached to the hand truck;
   a handle that is attached to the second end of the rod; and
   a threaded receiving nut, attached to the second end of the support housing, for receiving the threaded rod whereby rotating the handle changes the distance of the support housing from the hand truck, thereby adjusting an angle, defined between an exterior surface portion of the assembly attachment unit and the axis of the hand truck, by pivotal action about the first end of the lifting device.

18. A device for attaching to and carrying a brake drum and hub assembly of a vehicle comprising:
   a hand truck having a longitudinal axis;
   assembly attachment means connected to the hand truck for removably attaching to the assembly, the assembly attachment means being adjustable to conform to hub assemblies having various dimensions and number of studs; and
   lifting means attached to the hand truck and operably connected to the attachment means for adjusting the attachment means along the longitudinal axis of the hand truck.

19. The device according to claim 18 wherein a first end of the lifting means is pivotally attached to the hand truck and the device further comprises angle adjusting means for pivoting the lifting device about the first end, thereby adjusting an angle of a front surface portion of the attachment means to correspond to the angle presented by an exterior surface portion of an assembly.

20. The device according to claim 18 wherein the attachment means includes assembly clamping means.

21. The device according to claim 20 wherein the assembly clamping means comprises an adjustable assembly engaging strap that can be tightened about the assembly, thereby securing the assembly to the device.

22. A device for attaching to and carrying a brake drum and hub assembly of a vehicle, the brake drum and hub assembly including a plurality of studs, the device comprising a hand truck having an axis assembly attachment means connected to the hand truck for removably attaching to the assembly, the assembly attachment means including at least one stud attachment means for removably attaching to at least one of the studs, and lifting means attached to the hand truck and operably connected to the attachment means for adjusting the attachment means along the axis of the hand truck.

23. The device according to claim 22 wherein the stud attachment means comprises at least one stud attachment plate that defines an aperture dimensioned to receive a stud.

24. The device according to claim 23 wherein the device includes a plurality of attachment plates that are adjustably secured to the attachment means whereby moving the plates relative to the attachment means changes a first distance between centers of apertures defined by adjacent plates to a second distance, thereby changing the device from use with a first assembly to use with a second assembly.

25. The device according to claim 22 wherein the stud attachment means includes at least one stud clamp.

26. A device for attaching to and carrying a brake drum and hub assembly of a vehicle, the assembly having a plurality of studs arranged in a circle on an exterior surface thereof, the device comprising:
   a hand truck comprising a frame having an axis, a handle, and a base, wherein the base has a plurality of wheels attached thereto;
   an elongated support housing having a first end and a second end wherein the first end is pivotally attached to the base;
   a jack attached to the support housing;
   a support frame operably and removably attached to the jack whereby the jack can adjust the position of the support frame along the axis of the frame;
   an angle adjusting member comprising (a) an elongated threaded rod having a first end and a second end wherein the first end is attached to the frame, (b) a handle that is attached to the second end of the rod, and (c) a threaded receiving nut, attached to the second end of the support housing, for receiving the threaded rod whereby rotating the handle rotates the threaded rod in the nut thereby adjusting an angle, defined between an exterior surface portion of the assembly attachment unit and the axis of the hand truck, by pivotal action about the first end of the lifting device; and an assembly attachment unit, removably connected to the support frame, the attachment unit including a plurality of stud engaging plates wherein each plate defines an aperture dimensioned for receiving studs.

27. A method for removing a brake drum and hub assembly of a vehicle, the assembly having a plurality of studs on an exterior surface thereof, the method comprising the steps of:

raising a vehicle to an elevated position;

removing at least one wheel of the vehicle to expose the assembly;

placing a device adjacent to the assembly of the vehicle wherein the device comprises (a) a hand truck having an axis, (b) a jack that is attached to the hand truck, (c) an attachment unit that securely attaches to the assembly, the attachment being operably connected to the jack whereby actuating the jack moves the attachment unit along the axis of the hand truck, and (d) an angle adjusting member attached to the jack for changing an angle, defined between an exterior surface portion of the assembly attachment unit and the axis of the hand truck, by pivotal action about the first end of the jack;

adjusting the height of the assembly attachment unit to match the position of the assembly by actuating the jack;

adjusting an angle defined by an exterior surface portion of the assembly attachment unit to correspond to an angle presented by an exterior surface portion of the assembly by actuating the angle adjusting member;

attaching the assembly attachment unit to the assembly; and moving the device, having the assembly attached thereto, away from the vehicle.

* * * * *